(12) United States Patent
Meller et al.

(10) Patent No.: US 9,169,915 B2
(45) Date of Patent: Oct. 27, 2015

(54) PRESSURE PORTION AND PRESSURE PORTION SYSTEM HAVING PRESSURE PORTION

(71) Applicant: GAPI Technische Produkte GmbH, Rosrath (DE)

(72) Inventors: Dieter Meller, Alfter (DE); Andreas Flint, Cologne (DE)

(73) Assignee: GAPI Technische Produkte GmbH, Rösrath (DE)

( * ) Notice: Subject to any disclaimer, the term of this patent is extended or adjusted under 35 U.S.C. 154(b) by 290 days.

(21) Appl. No.: 13/713,180

(22) Filed: Dec. 13, 2012

(65) Prior Publication Data
US 2013/0152719 A1    Jun. 20, 2013

(30) Foreign Application Priority Data
Dec. 14, 2011 (DE) .................. 20 2011 109 028 U

(51) Int. Cl.
*F16H 1/04* (2006.01)
*F16H 57/023* (2012.01)
*B62D 3/12* (2006.01)
*F16H 55/28* (2006.01)

(52) U.S. Cl.
CPC .............. *F16H 57/023* (2013.01); *B62D 3/123* (2013.01); *F16H 55/283* (2013.01); *Y10T 74/1956* (2015.01)

(58) Field of Classification Search
CPC ....... F16H 55/28; F16H 55/283; B62D 3/123; B62D 5/22
USPC ............................................... 74/388 PS, 422
See application file for complete search history.

(56) References Cited

U.S. PATENT DOCUMENTS

| 5,845,532 A | * | 12/1998 | Phillips | 74/422 |
| 5,906,138 A | * | 5/1999 | Kostrzewa | 74/498 |
| 6,119,540 A | * | 9/2000 | Phillips | 74/422 |

(Continued)

FOREIGN PATENT DOCUMENTS

| DE | 19811917 A1 | 9/1998 |
| DE | 202010011990 U1 | 11/2010 |
| EP | 0788962 A2 | 8/1997 |

(Continued)

OTHER PUBLICATIONS

Int'l Search Report issued Feb. 14, 2012 in Int'l Application No. PCT/EP2011/004355.

*Primary Examiner* — Justin Krause
(74) *Attorney, Agent, or Firm* — Panitch Schwarze Belisario & Nadel LLP

(57) ABSTRACT

A pressure portion (1) includes a receiver (2) for adjustable lateral support of a rack (Z) for a steering arrangement of vehicles. The pressure portion (1) arranged in positionally variable relationship guided linearly in a guide passage (F) for adjustment of the support of the rack (Z) in an adjustment direction (e), and enlarged or expanded for at least partial contact at an inside wall side in the guide passage (F) with respect to a directional component (r2) which is radial relative to the adjustment direction (e). The pressure portion (1) has radially at an outside thereof an elastomeric force application aid (11) for transmission of forces from the pressure portion (1) to an inside wall (10) of the guide passage (F).

29 Claims, 10 Drawing Sheets

(56) References Cited

U.S. PATENT DOCUMENTS

| | | | |
|---|---|---|---|
| 6,142,031 A * | 11/2000 | Phillips | 74/422 |
| 2005/0257635 A1 * | 11/2005 | Damore et al. | 74/422 |
| 2007/0205572 A1 * | 9/2007 | Kubota et al. | 280/93.514 |
| 2008/0202271 A1 | 8/2008 | Heo | |

FOREIGN PATENT DOCUMENTS

| | | |
|---|---|---|
| EP | 1724180 A1 | 11/2006 |
| WO | 03097427 A1 | 11/2003 |
| WO | 2012/028294 A1 | 3/2012 |

\* cited by examiner

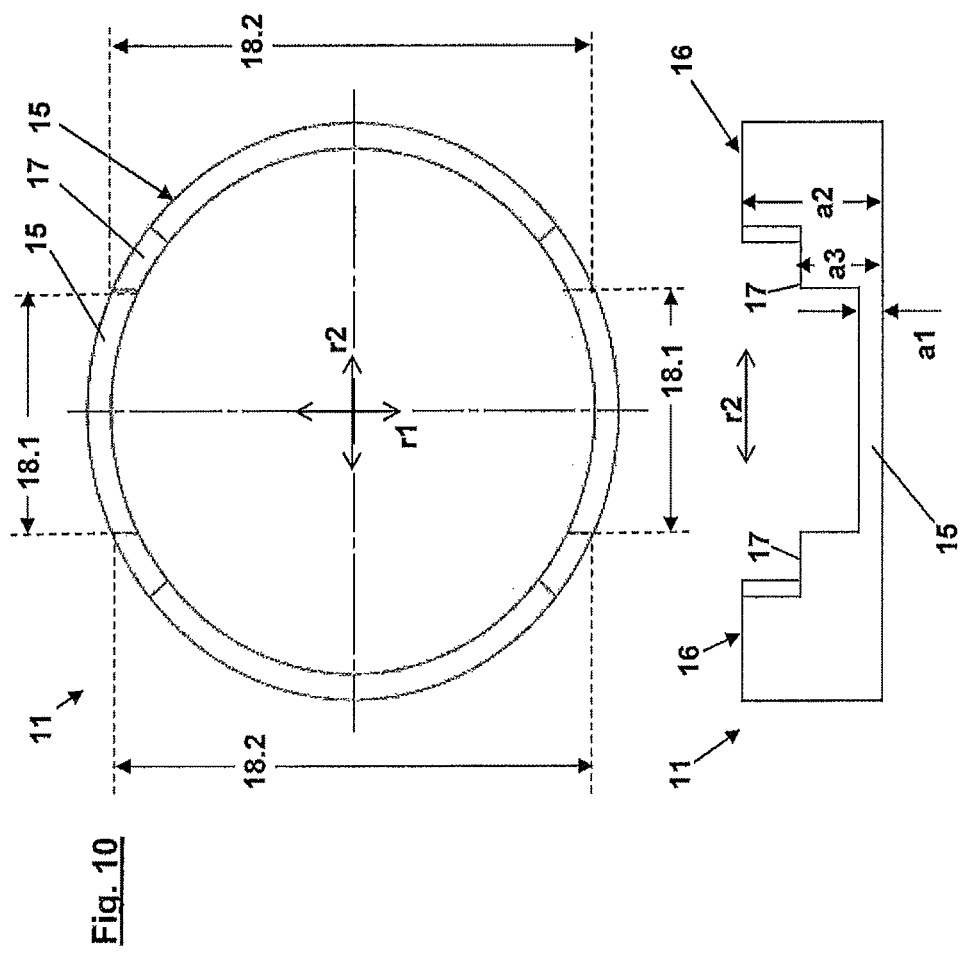

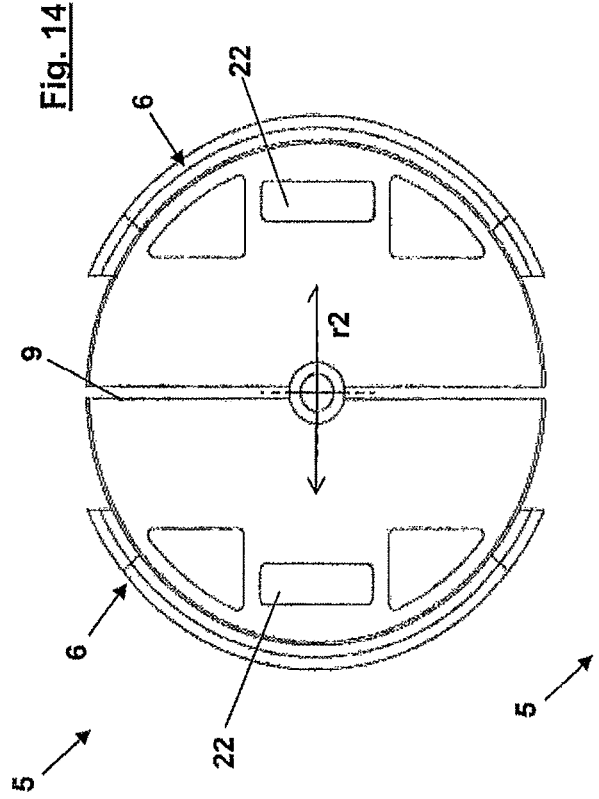
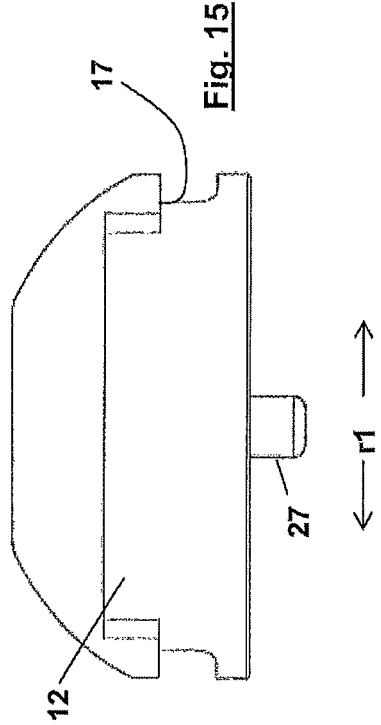
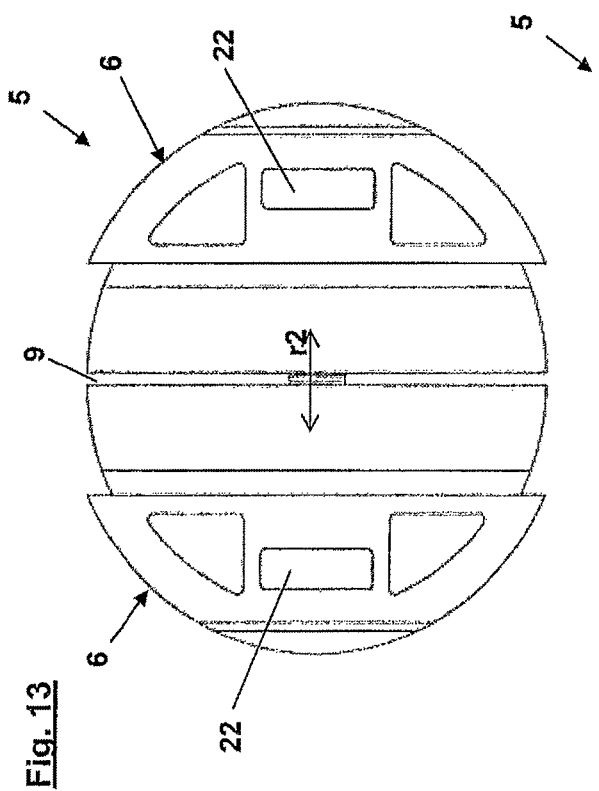
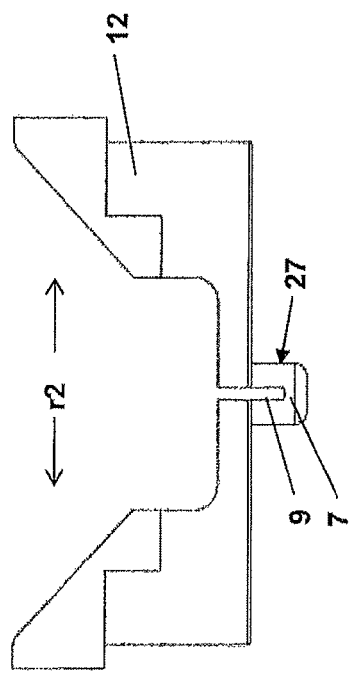

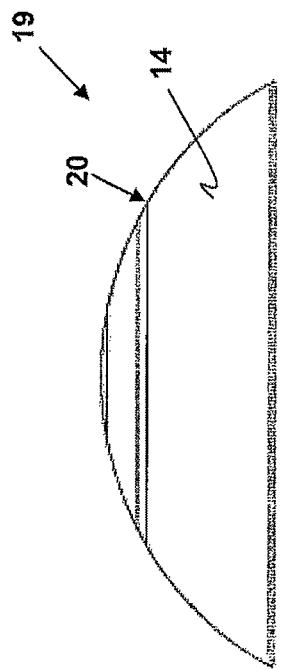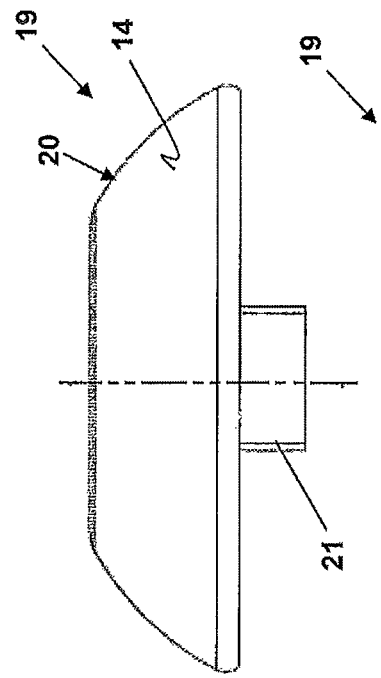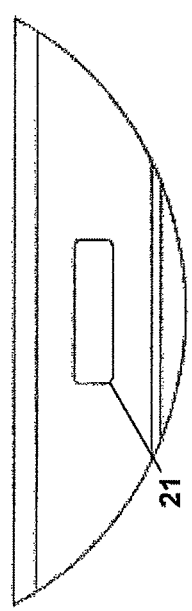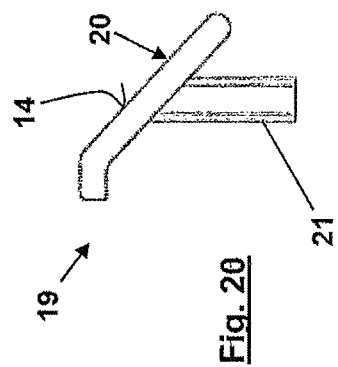

PRESSURE PORTION AND PRESSURE PORTION SYSTEM HAVING PRESSURE PORTION

BACKGROUND OF THE INVENTION

The present invention relates generally to a pressure portion having a receiver for adjustable lateral support of a rack for in particular a steering arrangement of vehicles, wherein the pressure portion can be arranged in positionally variable relationship preferably guided linearly in a guide passage for adjustment of the support of the rack in an adjustment direction and can be enlarged or expanded, in particular spread, for its at least partial contact at the inside wall side in the guide passage with respect to a directional component which is radial relative to the adjustment direction. The present invention is further related generally to a pressure portion system including the pressure portion and a guide passage in which the pressure portion is positionally variably arranged preferably linearly guided in an adjustment direction in a loose position for adjustment of the support for the rack and in a load position is arranged radially braced under a pressure load at the inside against the guide passage.

Such pressure portions or pressure portion systems are used in particular in a steering arrangement for guiding and supporting a rack. Such a rack has to be supported, in particular, in the region of its thread engagement with components of the steering arrangement such as, for example, with a threaded worm. Mounted in the pressure portion system, the rack is supported for rotational movement around and/or translatory movement along its axis of rotation in a receiver, wherein the adjustment direction is oriented as perpendicularly as possible to the axis of rotation of the rack.

A pressure portion or a pressure portion system of the general kind set forth is known from German Utility Model No. DE 20 2010 011 990 U, which describes a pressure portion which in the load position can bear substantially play-free against an inside wall of the guide passage and against the rack. The pressure portion can extend in that installation in a wedge-like configuration between the inside wall of the guide passage and the rack. Such prior art already permits precise guidance for the rack in the lateral direction. As long as the pressure portion remains pressed in play-free relationship against the rack its play-free contact can also be maintained at the inside wall of the guide passage.

BRIEF SUMMARY OF THE INVENTION

An objective of a preferred embodiment of the present invention is to be provide a pressure portion of the general kind set forth, which permits further improved play-free mounting of the pressure portion in the load position at the inside wall of the guide passage and the rack.

The specified objective is attained in that the pressure portion has radially at the outside an elastomeric force application aid for the transmission of forces from the pressure portion to an inside wall of the guide passage.

By virtue of the elastomeric force application aid the forces can be transmitted in specifically targeted relationship from the pressure portion to the inside wall of the guide passage. The elastomeric properties of the force application aid provide that the force application aid is deformable at least in parts in shape-fixed relationship, that is to say incompressibility, but elastically with constancy in respect of volume. When the loading is withdrawn the elastomeric force application aid is restored to its original shape. By virtue of the elastomeric properties of the force application aid the pressure portion can engage the inside wall of the guide passage in flat relationship in the region of the force application aid. Preferably, the radial extent of the pressure portion in its loose position is only a few to some tenths of a millimeter smaller than that of the guide passage.

In the load position the elastomeric force application aid, as a consequence of its radially outward positioning, can bear in completely play-free and snug relationship against the inside wall, in which case even very small deviations in the outside wall from an ideal shape can be compensated, as a consequence of the elastomeric properties of the force application aid. When the load is removed the elastomeric force application aid can move elastically back into its original shape by virtue of its elastomeric properties. Thus, the elastomeric force application aid, in the position of installation in the guide passage, can come loose from the inside wall of the guide passage again, when the load is removed, whereby the pressure portion arranged in the guide passage is moved again into the loose position.

As a consequence of the pressure portion being caused to bear elastically snugly against the inside wall by way of the force application aid, the play-free support can be permanent. Because of the elastomeric properties the play-free support can be retained even when "loosening" of the pressure portion from the rack occurs for example due to wear of the receiver against the rack. Such loosening can be a few to some tenths of a millimeter, using usual elastomeric materials. It is also possible to set any desired bearing play in respect of the rack. For that purpose suitable positional adjustment of the pressure portion can be effected with the desired play on the guide passage. That can be advantageous for example in the case of a possible rotatable mounting of a rotatable spindle in the pressure portion system.

Enlargement or expansion, in particular spreading, of the receiver is already described in DE 20 2010 011 990 U, to which reference is directed here. Therefore this will only be briefly discussed here: for its expansion or spreading the receiver can have a slot or incision which is introduced into the pressure portion in opposite relationship to the adjustment direction from an end which is at the rear in the adjustment direction. In that respect that slot can extend to an end of the pressure portion which is the front end in the adjustment direction, in such a way that only a small partial region is maintained unslotted. In that way, the receiver can be divided into two halves which are connected together by way of the unslotted part of the rear end, preferably by a connection involving intimate joining of the materials involved, preferably by way of a projection at the end. In that arrangement the slot can extend into the projection. With radial fixing of the position of the rear end at the adjuster, the receiver can be radially enlarged or spread at its front end, with a loading of the pressure portion. In that way, the two receiving halves and therewith the elastomeric force application aid can be pressed radially against the inside wall of the guide passage and can fix the receiver play-free against the guide passage. Instead of the provision of a slot the receiver can alternatively be divided completely into two receiving halves which thus form two independent portions of the receiver. In that arrangement, the rear ends thereof are fixed radially in position in a condition of being combined together, on the adjustment device. Depending on a possible radial play in respect of the supported rearward ends of the receiver, the receiver, if with play or radial guidance, can be radially increased in size or, if practically without play, it can be radially expanded.

The force application aid can be coated with an elastomeric material for example at its surface which in the installation position preferably faces towards the inside wall. The force application aid can be provided completely or only with one or more layers of an elastomeric material or a plurality of elastomeric materials. The force application aid can be formed for example in a sandwich structure with at least one elastomeric layer which extends in the axial and peripheral direction in the position of installation into the pressure portion with respect to an axial direction of the pressure portion. The force application aid can have a coating including elastomeric material, preferably at its side towards the inside wall in the installation position. Preferably the force application aid is made completely from a material or a plurality of elastomeric materials. Usual elastomeric materials such as plastic materials, preferably with coiled polymer chains, or rubber materials, are considered. Preferably, the Shore hardness of the elastomeric force application aid or its elastomeric material can be of a value in the range of between 50 and 100, preferably between 60 and 90 or between 65 and 85. Preferably, the force application aid is in one piece.

The force application aid can be arranged at least in respect of part of the periphery on the pressure portion or can at least over part of the periphery engage the inside wall of the guide passage in the load position of the pressure portion in the guide passage The force application aid can be arranged over the full periphery radially outwardly on the pressure portion in mechanical-force advantageous relationship. In the load position of the pressure portion the force application aid can bear in the guide passage at the inside thereof over the full periphery at the inside wall of the guide passage.

Adjustment of the pressure portion in the guide passage can be effected as already described in detail in DE 20 2010 011 990 U, to which attention is expressly directed in this connection. For that purpose, for example, there can be provided a threaded connection with a thread advance means which engages the guide passage at the inside thereof in force-operative relationship in the adjustment direction. The thread connection can be self-locking. The adjuster can have at the front in the adjustment direction an adjusting screw with a tool opening which is open in opposite relationship to the adjustment direction and with a male thread for threaded engagement in a female thread in the guide passage. At the rear in the adjustment direction, the adjuster can have a preferably cylindrical portion for receiving axial forces from the receiver.

In a structurally simple configuration the adjuster can be arranged on the pressure portion at the front in the adjustment direction. In a simple structure the receiver can be provided on the pressure portion at the rear in the adjustment direction.

Advantageously in terms of mechanical force the force application aid can be arranged in a force flow region between the receiver and the adjuster of the pressure portion. In that respect the force application aid can be supported axially in the adjustment direction at the receiver and axially in opposite relationship to the adjustment direction at the adjuster. That support can be such that the forces are transmitted from the receiver to the adjuster completely by way of the force application aid at least in a radial region of the pressure portion in which the force application aid is arranged at the pressure portion. Preferably, the radial forces to be transmitted from the pressure portion to the inside wall of the guide passage are transmitted at least almost completely by way of the force application aid. Preferably, the pressure portion bears against the inside wall of the guide passage in the load position at the inside solely by way of the force application aid. In that respect a thread connection which is possibly provided, with a thread advance means for the adjustment, is not taken into account, as this necessarily cannot be designed for radial support but for axial support of the pressure portion.

The pressure portion can be of round, preferably circular cross-sectional geometries. The force application aid can be arranged at least over part of the periphery on the pressure portion. In that way the pressure portion and the guide passage can each be of a cylindrical geometry.

Advantageously in terms of manufacture, the force application aid can be of a hollow cylinder-like configuration, with a preferably constant radial wall thickness. As a simplification of the structural configuration of the pressure portion and advantageously in terms of mechanical force, the force application aid can be in one piece.

The force application aid can be supported radially inwardly against the pressure portion. For mounting the force application aid the pressure portion can have a radially outwardly open first receiving chamber. The force application aid can be supported in positively locking relationship in the first receiving chamber or chambers. For that purpose the force application aid can be arranged held axially non-displaceably in the first receiving chamber. The first receiving chamber can be delimited by the receiver and the adjuster. Preferably the first receiving chamber is delimited by the receiver axially in the adjustment direction and by the adjuster axially in opposite relationship to the adjustment direction. The adjuster and/or the receiver can radially inwardly laterally delimit the first receiving chamber.

The first receiving chamber can be of an at least partially radially conically enlarged configuration for radial elastomeric deformation of the force application aid under load. Thus, the elastomeric force application aid in adjustment of the pressure portion in relation to the rack can be additionally afforded space for elastomeric deformation for play-free contact against the inside wall of the guide passage.

For that purpose, the first receiving chamber can be of a radially inwardly conically enlarged configuration radially inwardly and at the front in the adjustment direction by way of a first radial portion at a first angle. The first receiving chamber can be of a radially outwardly conically enlarged configuration radially outwardly and at the rear in the adjustment direction by way of a second radial portion at a second angle. In that way, with the movement of the pressure portion from the loose position into the load position, to maintain its constancy in respect of volume, the force application aid can be respectively deformed into the conical enlargement configuration radially outwardly at the rear in the adjustment direction and radially inwardly at the front in the adjustment direction. It can be deduced from the geometry involved that that deformation is at a maximum in the radial direction of the expansion or enlargement of the receiver, in which respect reference may be made here in a first approximation to a parallelepipedic deformation. Advantageously in terms of the deformation aspect the two angles and/or the two radial portions can each be the same. The angles can be for example less than 7°. The portions can advantageously each have half the radial wall thickness of the force application aid.

The receiver can delimit a preferably channel-like receiving space for the rack. For that purpose the receiving space can extend channel-like in a first radial direction perpendicularly to the adjustment direction. For example, there can be two first receiving chambers which are arranged in mutually opposite relationship in a second radial direction arranged perpendicularly to the first radial direction, with a force application aid being disposed in each first receiving chamber.

In a preferred configuration of the pressure portion of the present invention, the first receiving chamber can have two first partial peripheral regions which are disposed in radially mutually opposite relationship in a first radial direction and which are open in the adjustment direction. Those partial regions can advantageously extend in their periphery in each case symmetrically relative to the first radial direction, for the sake of symmetries in respect of force and deformation. As, in relation to lateral support, for example of the rack in the first radial direction only slight enlargement or increase in size of the receiver, if at all, can occur, it is advantageous for a possible shearing movement of the force application aid not to be constricted in that region in the peripheral direction and thus not to provide any limitation in respect of the first receiving chamber in the adjustment direction. Adjoining the first partial regions, it is possible to provide second partial regions of the first receiving chamber which however, as described above, are closed in the adjustment direction. The second partial regions can be arranged in mutually opposite relationship in relation to the adjustment direction in a second radial direction. Desirably the first partial regions each extend in the peripheral direction symmetrically relative to the second radial direction. In that way, the force application aid can have two mirror symmetries, one in relation to a longitudinal sectional plane having a first radial direction, as the first mirror plane, and one in relation to a longitudinal sectional plane having the second radial direction, as the second mirror plane. In that way, it is possible to achieve corresponding force symmetries at the force application aid.

The first partial peripheral regions of the first receiving chamber can respectively extend over a first angular range of greater than/equal to 45° and smaller than/equal to 150°, preferably greater than/equal to 60° and smaller than/equal to 120°, in particular greater than/equal to 70° and smaller than/equal to 90° or through 80°. Accordingly, the second partial peripheral regions of the first receiving chamber can respectively extend over a second angular range of greater than/equal to 30° and smaller than/equal to 135°, preferably greater than/equal to 60° and smaller than/equal to 120°, in particular greater than/equal to 90° and smaller than/equal to 110° or through 100°.

The above-described positively locking arrangement of the force application aid can also be so provided that the force application aid is held with respect to the adjustment direction axially, radially inwardly and/or in peripheral relationship, in the first recess. For that purpose, the first receiving chamber can preferably be so enlarged in the adjustment direction that the correspondingly adapted force application aid is also held in positively locking relationship in the peripheral direction in the first chamber. That enlargement of the first receiving chamber can be continuous with respect to a radial plane, that is to say a plane with a radial normal to the plane or, preferably, can be stepped. In all cases the profile of the force application aid is adapted to the first receiving chamber in positively locking relationship.

In detail, the force application aid can have at the front in the adjustment direction a full-peripheral base ring of the first axial extent, which has a configuration that is continuous in the peripheral direction from the first radial direction to the second radial direction or has an enlarging configuration by way of at least one step in the adjustment direction axially to a second axial extent.

Thus, adjoining the base ring in the adjustment direction in a connection involving intimate joining of the materials involved, at least one projection of a second axial extent can extend thereon. The first radial extent can be less than the second radial extent. The first radial extent can be less than or equal to half an axial extent of the force application aid, preferably less than or equal to a quarter or a sixth of the axial extent of the force application aid. The transition from the base ring to the projection can be continuous, for example narrowing the projection in the adjustment direction, like trapezoidal, or enlarging, like a dovetail profile. Preferably, the transition is discontinuous, in particular step-like as described above.

In an alternative preferred embodiment of the pressure portion of the present invention, an elastomeric spring arrangement can be provided in the force flow region between the receiver and the adjuster. It can be arranged radially inwardly to and preferably in front of the force application aid in the adjustment direction. In that arrangement the force application aid can preferably directly adjoin the elastomeric spring arrangement with respect to a direction radially outwardly. Accordingly, a flow of force can advantageously take place by way of the elastomeric components, being the force application aid and the elastomeric spring arrangement, by way of the radial region in which the force application aid and the elastomeric spring arrangement are disposed between the receiver and the adjuster.

The elastomeric spring arrangement and the force application aid can be arranged in mutually parallel relationship with respect to an axial transmission of force between the adjuster and the receiver.

The elastomeric arrangement can be arranged in a second receiving chamber delimited by the receiver and the adjuster. In that case, the receiver and the adjuster can be supported against the elastomeric spring arrangement.

The receiver and the adjuster preferably can engage centrally into each other by way of a plug-in connection with center centering of them themselves and/or with center centering of the elastomeric spring arrangement in such a way that at most low axial forces are transmitted here. For that purpose, the elastomeric spring arrangement can have a central through opening through which the receiver and the adjuster can engage into each other, providing for the configuration of a plug connection. In particular, at its end which is the front end in the adjustment direction the receiver can have an extension which engages into a central opening provided on the adjuster, engaging through the central through opening of the elastomeric spring arrangement. In that case, the extension can be guided displaceably preferably with a low level of friction, in the central opening. In that way, advantageously in terms of mechanical force for the adjustment of play, the entire axial transmission of force between the receiver and the adjuster can be implemented by way of the elastomeric components, the force application aid and the elastomeric spring arrangement.

In an alternative preferred embodiment of the pressure portion of the present invention, the elastomeric spring arrangement can have at least two elastomeric springs, namely a first elastomeric spring and a second elastomeric spring. The elastomeric springs can be arranged coaxially relative to a longitudinal central axis of the pressure portion and in radially mutually adjoining relationship, wherein the first elastomeric spring is arranged radially inwardly and the second elastomeric spring is arranged radially outwardly. The elastomeric springs can be of a disk-configuration with larger side surfaces, which are arranged perpendicularly to the central longitudinal axis in the installation position. The two elastomeric springs can be of the same axial thickness, wherein the axial thickness of the two elastomeric springs is the same.

The two elastomeric springs can be of a spring-elastic nature of different hardness. In particular, the first elastomeric spring can be elastically soft and the second elastomeric spring can be elastically hard. The first elastomeric spring can serve in particular to compensate for mechanical oscillations and vibrations which occur. Thus, it is possible to prevent the pressure portion system from "rattling." The second elastomeric spring can be provided in particular for supporting the receiver relative to the adjuster. It can be designed to transmit predominantly rather static support forces.

To compensate for a flow in respect of volume upon loading of the elastomeric springs with constancy in respect of volume thereof, the first elastomeric spring and/or the second elastomeric spring can be of such a configuration and/or arrangement that there is space for a flow in respect of volume of the respective elastomeric spring, for deformation purposes. That can be achieved, for example, by an in particular slight radial spacing of the two elastomeric springs. In that case, there can be provided spacer elements, preferably integrally connected to one of the elastomeric springs, for exact radial positioning of the elastomeric springs relative to each other and/or relative to the wall of the second receiving chamber. In addition, the first elastomeric spring and/or the second elastomeric spring can have recesses, apertures, openings, slots and the like, into which the respective elastomeric spring can be deformed. For example, at least the second elastomeric spring can have at least axial through opening. Preferably, there are a plurality of through openings which are desirably arranged ring-like, that is to say on a peripheral circle, and at peripherally equally spaced relationship with each other.

The Shore hardness of the first elastomeric spring can be of a value in a range of between 30 and 90, preferably between 40 and 80 or between 50 and 70. The Shore hardness of the second elastomeric spring can be established in the range of between 50 and 100, preferably between 60 and 90 or between 65 and 85. The Shore hardness of the first elastomeric spring can be between 20% and 95% of the Shore hardness of the second elastomeric spring. The Shore hardness of the second elastomeric spring can be at least approximately equal to the Shore hardness of the force application aid.

In a further alternative preferred embodiment of the pressure portion of the present invention, at least in the regions intended for lateral contact against the rack the receiver can have a coating with preferably a highly wear-resistant plastic material with modified sliding properties. Alternatively, there can be provided at least one preferably plate-like sliding body which is or can be fixed to the receiver, preferably comprising the highly wear-resistant plastic with modified sliding properties. The sliding body can be secured to the receiver in such a way that it is easily replaceable. For that purpose it can be arranged on the receiver by means of a plug connection. That is advantageous as in operation it can wear more easily than the other components of the pressure portion.

In an advantageous preferred embodiment of the pressure portion of the present invention, there can be provided, in the force flow region between the receiver and the adjuster, a distributor plate with at least one plane that is inclined relative to the adjustment direction, for diversion of axial forces radially outwardly, wherein the inclined plane is inclined at an angle radially outwardly. For that purpose, the inclined plane can be provided on the distributor plate at the end thereof in the installation position thereof.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 10 shows a plan view of the force application aid of the present invention;

FIGS. 11 and 12 show a first side view and a second side view, respectively, of the force application aid of FIG. 10;

FIG. 13 shows a plan view of a receiving body of the receiver of the pressure portion of FIG. 5;

FIG. 14 shows a view from below of the receiving body of FIG. 12;

FIGS. 15 and 16 show a first side view and a second side view, respectively of the receiving body of FIG. 13;

FIG. 17 shows a plan view of a sliding body of the receiver of the pressure portion of FIG. 5;

FIG. 18 shows a first side view of the sliding body of FIG. 17;

FIG. 19 shows a view from below of the sliding body of FIG. 17;

FIG. 20 shows a second side view of the sliding body of FIG. 17;

DETAILED DESCRIPTION OF THE INVENTION

Figure 1:
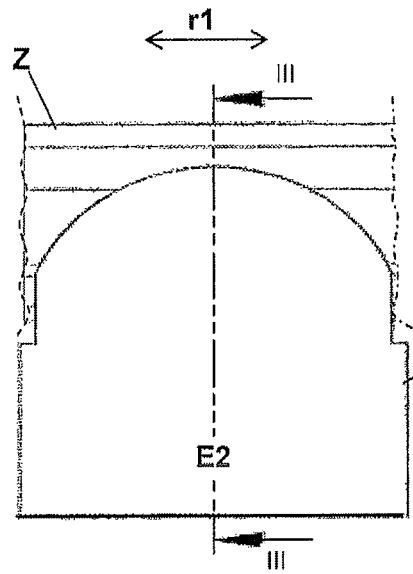
FIGS. 1 and 2 show a first side view and a second side view, respectively, of a pressure portion system of a pressure portion in a guide passage, with mounted rack, in accordance with a first preferred embodiment of the present invention.

Certain terminology is used in the following description for convenience only and is not limiting. The words "front" and "rear" designate directions in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Figure 2:
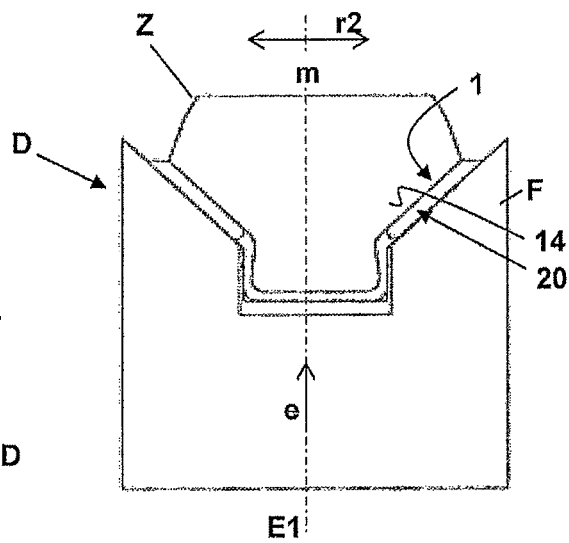
Figure 3:
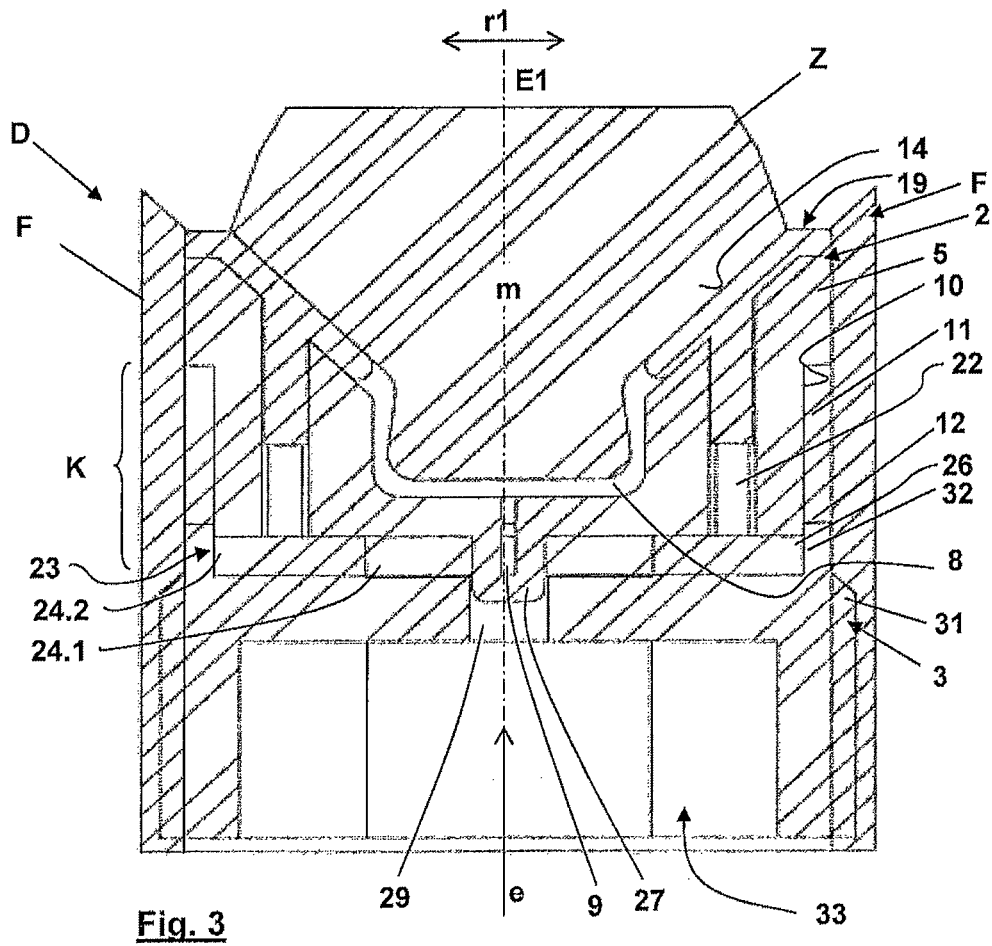
FIG. 3 shows a longitudinal sectional view along section line in FIG. 1.
Figure 4:
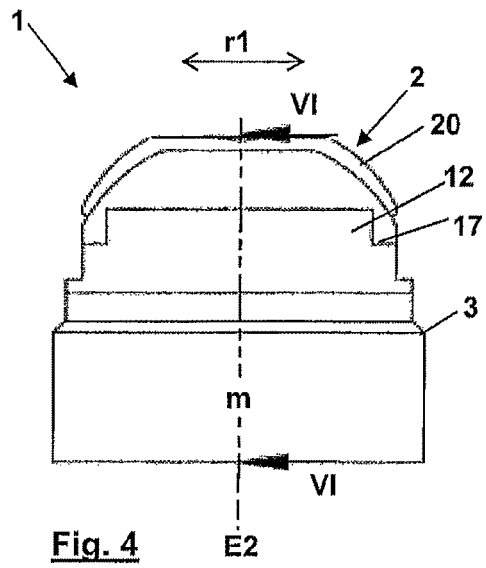
FIGS. 4 and 5 show a first side view and second side view, respectively, of the first preferred embodiment of the pressure portion of FIG. 1, with force application aid, receiver, adjuster and elastomeric spring arrangement.
Figure 5:
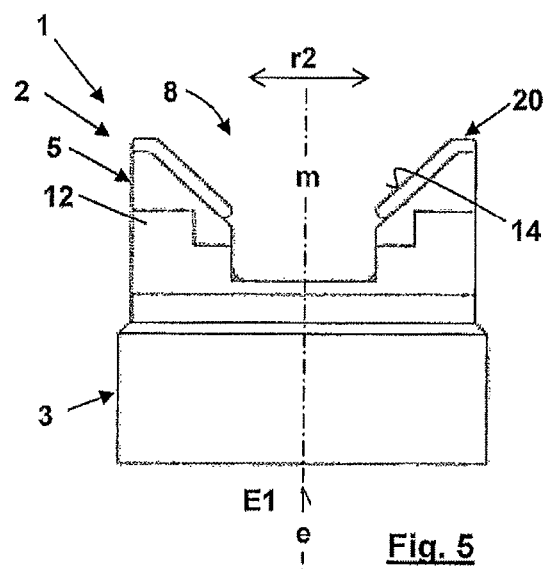
Figure 6:
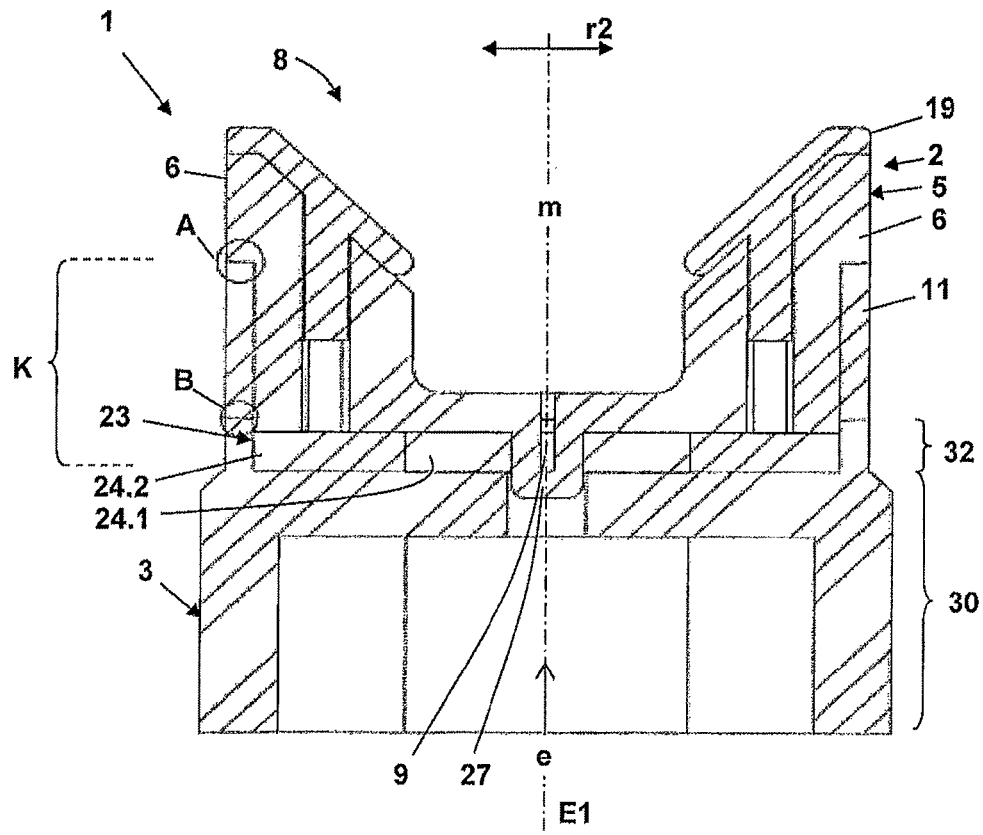
FIG. 6 shows a longitudinal sectional view along the longitudinal section line VI-VI in FIG. 5.
Figure 7:
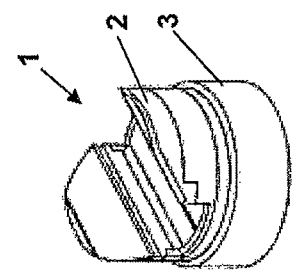
FIG. 7 shows a perspective plan view of the first preferred embodiment of the pressure portion of FIG. 5.
Figure 9:
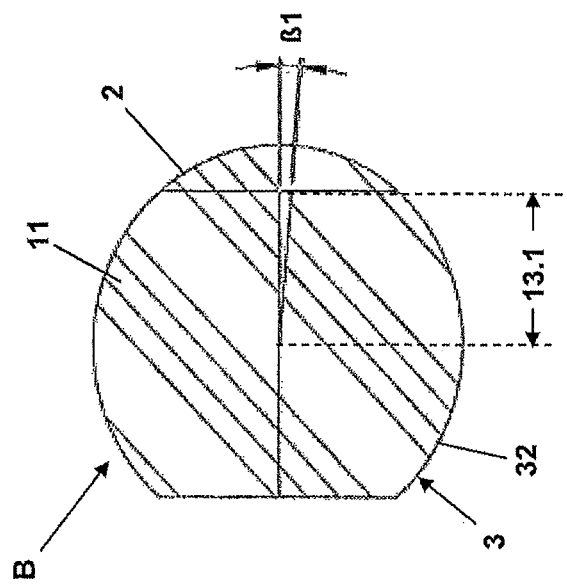
FIG. 9 shows an enlarged view of a portion B from FIG. 6.
Figure 8:
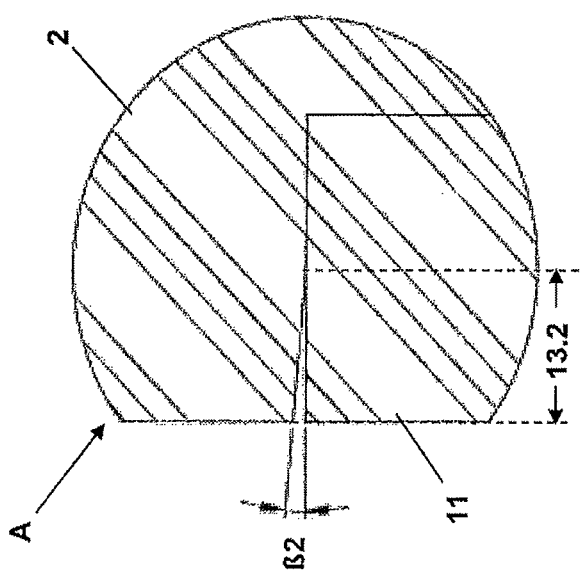
FIG. 8 shows an enlarged view of a portion A from FIG. 6.
Figure 21:
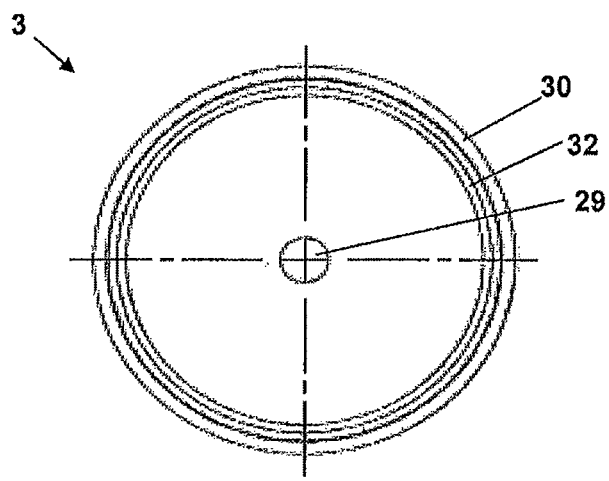
FIG. 21 shows a plan view of the adjuster of the pressure portion of FIG. 5.
Figure 22:
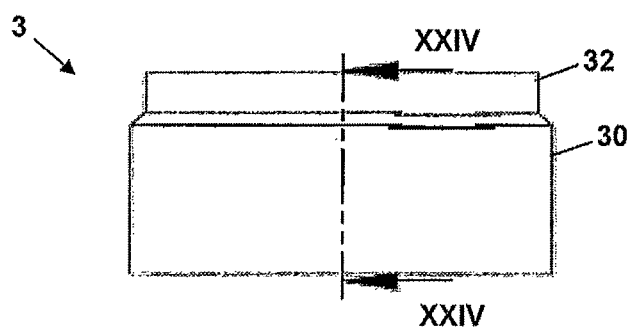
FIG. 22 shows a side view of the adjuster of FIG. 21.
Figure 23:
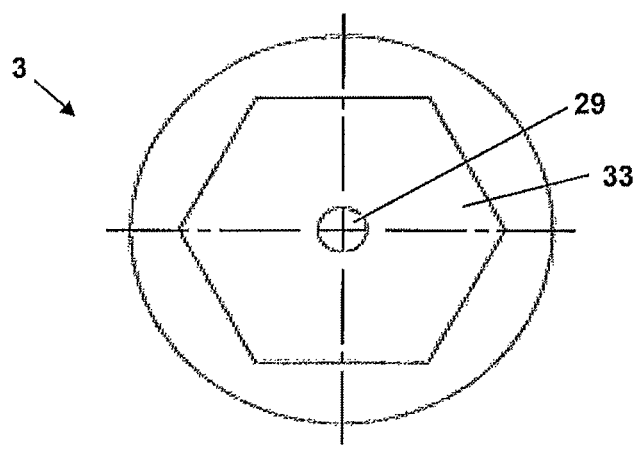
FIG. 23 shows a view from below of the adjuster of FIG. 21.
Figure 25:
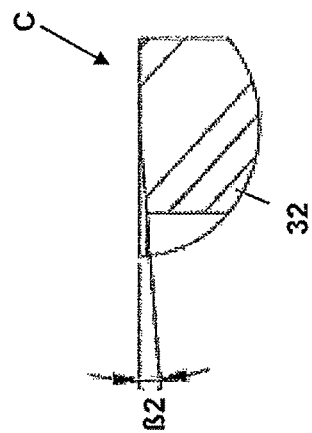
FIG. 25 shows an enlarged view of a portion C of FIG. 24.
Figure 24:
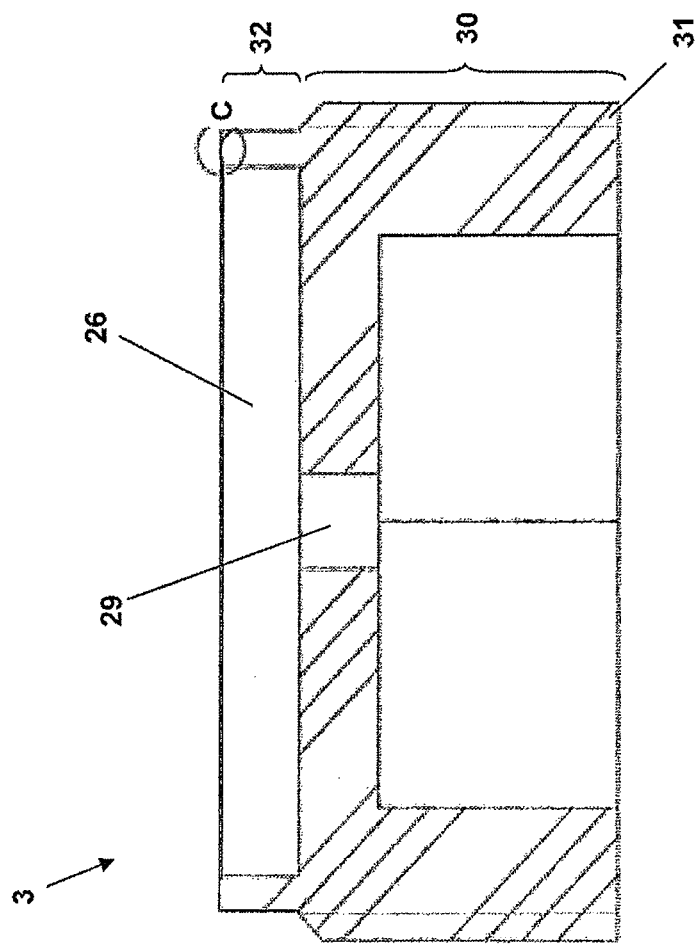
FIG. 24 shows a longitudinal sectional view along the section line XXIV-XXIV in FIG. 22.
Figure 26:
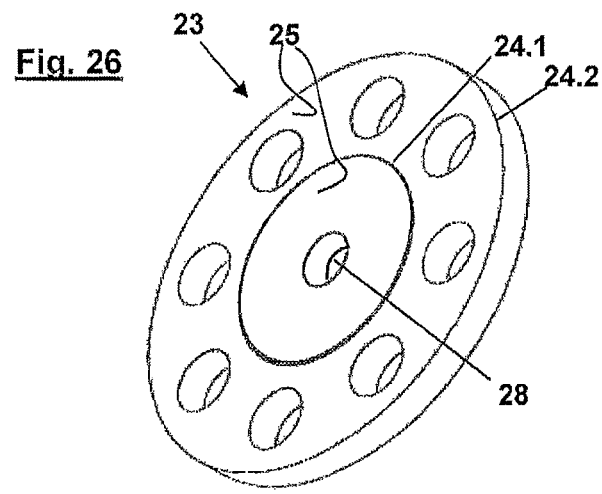
FIG. 26 shows a perspective plan view of the elastomeric spring arrangement of the pressure portion of FIG. 4, with a first and a second elastomeric spring.
Figure 27:
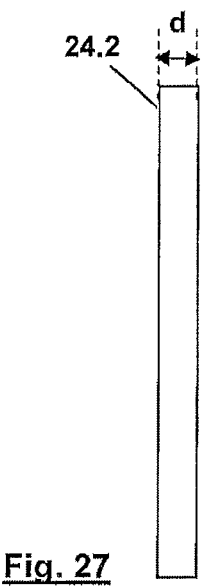
FIGS. 27 and 28 show a side view and a plan view, respectively, of the second elastomeric spring.
Figure 28:
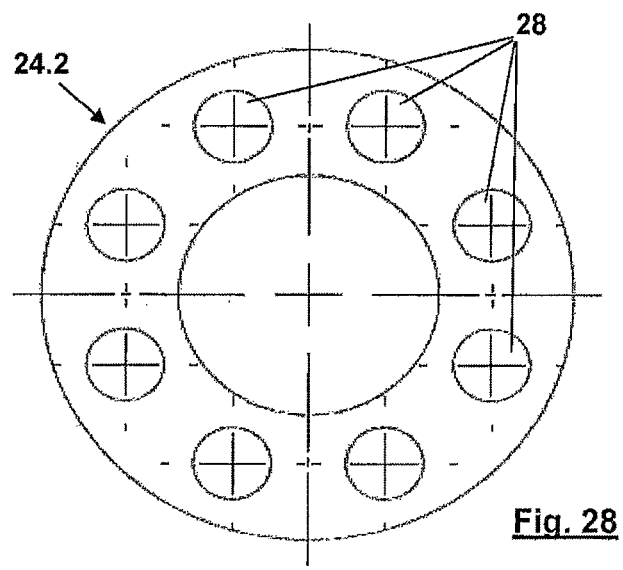
Figure 29:
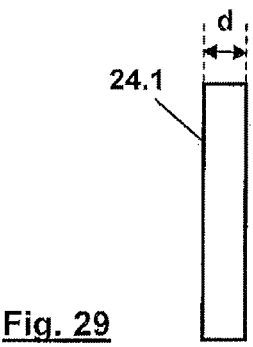
FIGS. 29 and 30 show a side view and a plan view, respectively of the first elastomeric spring.
Figure 30:
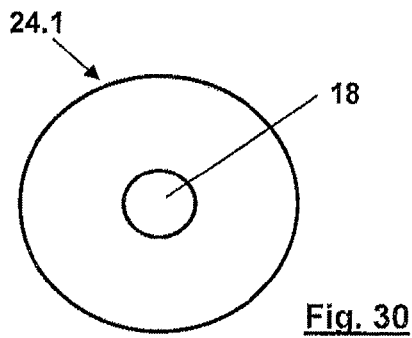
Figure 32B:
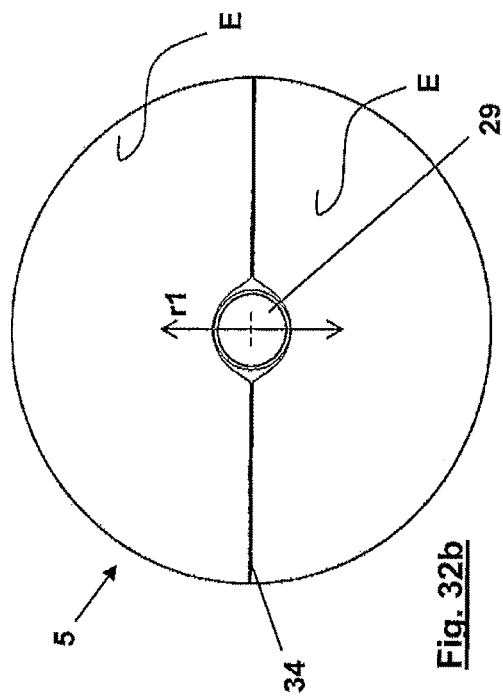
FIGS. 32a and 32b show a plan view of the pressure plate of FIG. 31 with a first embodiment and a second embodiment, respectively.
Figure 31:
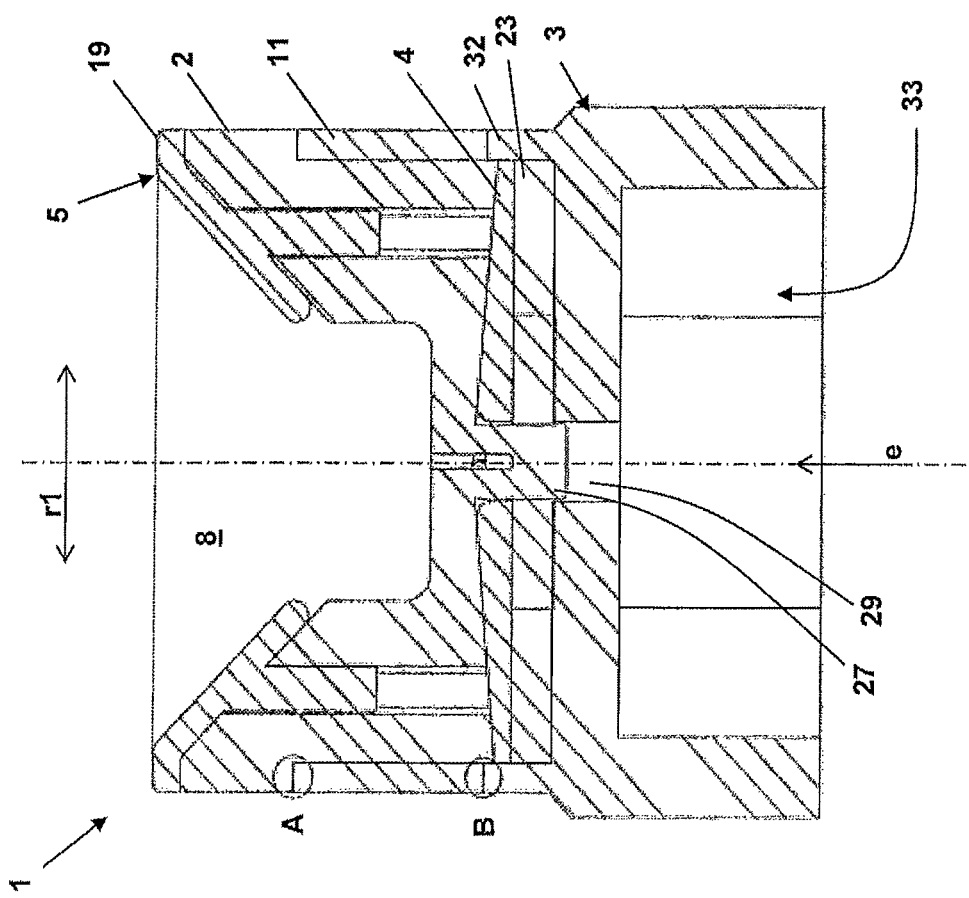
FIG. 31 shows a longitudinal sectional view of a second preferred embodiment of the pressure portion with pressure plate.

Referring to the drawings in detail, wherein like numerals indicate like elements throughout the several views, FIGS. 1-3 show two side views and a longitudinal sectional view of a pressure portion system D having a pressure portion 1 in a first preferred embodiment. A pressure portion 1 has a receiver 2 for lateral support, adjustable by means of an adjuster 3, of a rack Z for a vehicle steering arrangement. The rack Z is supported in the receiver 2. The pressure portion 1 is arranged variably in respect of position guided linearly in an adjustment direction e in a release position in a guide passage F for adjusting the support for the rack Z. FIGS. 3-30 show that pressure portion 1 or individual components or units thereof in various views. FIG. 31 shows a longitudinal sectional view of a second preferred embodiment of the pressure portion 1 with an additional distributor plate 4 which is shown in two embodiments in FIGS. 32a and 32b.

For play-free contact at the inside wall side in the guide passage F, the pressure portion 1 is spreadable here with adjustment in relation to the rack Z from the release position into a load position, with respect to a second direction r2 which is radial relative to the adjustment direction e. For that purpose the receiver 2 has a receiving body 5 comprising two mirror-symmetrical receiving halves 6 which are only connected at the front in the adjustment direction e by means of a connecting limb 7. There is provided a receiving space 8 for the rack Z, the receiving space extending channel-like in a first radial direction perpendicularly to the adjustment direction e. Out of the receiving space, provided in the receiving body 5 in opposite relationship to the adjustment direction e is a slot 9 which extends laterally in a first radial direction and which separates the receiving halves 6 and which is arranged to extend to the connecting limb 7. As can be seen in particular in FIG. 3, a pressure is exerted on the receiver 2 with adjustment of the pressure portion 1 in relation to the rack Z, by means of which the two receiving halves 6 are pressed at the inside against the inside wall 10 of the guide passage F, with spreading approximately in the second radial direction r2, in such a way that the pressure portion 1 is wedged at the inside wall 10. The pressure portion 1 here has a cylindrical main shape with a central line in the adjustment direction e. The structure of the pressure portion 1 and also the pressure portion system D has two mirror-symmetry planes, wherein a first mirror-symmetry plane E1 is determined by the first radial direction r1 and the central longitudinal axis m and the second mirror-symmetry plane E2 is determined by the first radial direction r1 and the central longitudinal axis m. In general terms, the first and second side views shown in the figures are so oriented that the first radial direction extends in the plane of the drawing in the first radial side view and the second radial direction extends in the plane of the drawing in the second radial side view.

Arranged radially outwardly and here over the full periphery on the receiver 2 of the pressure portion 1 is an elastomeric force application aid 11 for the transmission of forces from the pressure portion 1 to the inside wall 10 of the guide passage F. By virtue of the elastomeric properties, already described hereinbefore, of the force application aid the latter is pressed in the load position flat and with compensation for production tolerances and unevenness against the inside wall 10 in such a way that the pressure portion 1 bears absolutely play-free against the rack Z and can also compensate for play, caused for example by wear, of the rack. The force application aid 11 which here is in one piece has a hollow-cylindrical basic shape with a constant wall thickness, as can be seen in particular from FIGS. 10 through 12.

The adjuster 3 of the pressure portion 1 is arranged in front of the receiver 2 of the pressure portion 1 in the adjustment direction e. The force application aid 11 is arranged is a force flow region K between the receiver 2 and the adjuster 3 in such a way that axial forces in the radial region of the force application aid 11 are transmitted directly by way of the latter. In other words, the force application aid 11 is supported axially in opposite relationship to the adjustment direction e against the adjuster 3 and in the adjustment direction e and radially inwardly against the receiver 2.

For that purpose, there is provided a radially outwardly opened first receiving chamber 12, in which the force application aid 11 is held in positively locking relationship. The first receiving chamber 12 is delimited in the receiver 2 at the rear in the adjustment direction e and radially inwardly and by the adjuster 3 in opposite relationship to the adjustment direction e.

To achieve optimum deformation of the elastomeric force application aid 11 with constancy in respect of volume, the first receiving chamber 12 is partially of a radially conically enlarged configuration. For that purpose, the first receiving chamber 12 is enlarged radially inwardly at a first angle $\beta 1$ at the front in the adjustment direction by way of a first radial portion 13.1. In addition, the first receiving chamber 12 has a radially outwardly conically enlarged configuration at a second angle $\beta 2$ radially outwardly and at the rear in the adjustment direction e by way of a second radial portion 13.2. In that way, the force application aid 11 can be deformed into the two conical enlargements with constancy in respect of volume, with spreading of the two receiving halves 6 of the receiver 2 in the second radial direction r2, similarly to a parallelepiped. The enlargements are clearly in the detailed views in FIGS. 8 and 9. It can also be seen from those views that the two angles $\beta 1$, $\beta 2$ and the two first radial portions 13.1, 13.2 are respectively of equal magnitude to provide enlargements of equal size.

By virtue of the preferred embodiments illustrated herein of the pressure portion 1 with the two receiving halves 6 and the channel-like receiving space 8 for lateral support of the rack Z, there is provided here a unique force receiver insofar as the rack Z is laterally supported at receiving surfaces 14 which face with a directional component in the second radial direction. The force application aid 11 is therefore adapted to correspond to those force conditions.

As can be seen particular from FIGS. 10-12 with individual views of the force application aid 11 the force application aid 11 has a discontinuous configuration in the peripheral direction (for easier understanding, the two radial directions r1, r2 in which the force application aid 11 is oriented in the installation position in the pressure portion 1 are also specified here). The force application aid 11 can be described with a base ring 15 which is at the front in the adjustment direction e and which has a first axial extent a1, from which two projections disposed in mutually opposite relationship in the second radial direction, each of a respective second axial extent a2, extend in the adjustment direction e. The transition from the first axial extent a1 of the ring 15 to the second axial extent a2 of the projection 16 is afforded here by way of a step 17 of a third axial extent a3.

The first receiving chamber 12 has a configuration corresponding to the force application aid 11. As can be seen in particular from FIGS. 13-16 with views of the receiving body 5, the first receiving chamber 12 has a correspondingly stepped configuration. For that purpose, the first receiving chamber 12 is opened in the adjustment direction e in first partial peripheral regions 18.1 which are in mutually opposite relationship in the first radial direction r1. The first receiving chamber 12, like the projection 16 of the force application aid 11, has a step-like configuration in respective second partial peripheral regions 18.2 respectively disposed between the first partial peripheral regions 18.1. In that way the force application aid 11 disposed in the first receiving chamber 12 is held in positively locking relationship with respect to an axial, peripheral and radially inwardly facing direction. The second partial peripheral regions 18.2 are arranged symmetrically relative to the second radial direction r2 and thus in the direction of spreading of the receiver 2 under load, in which maximum elastomeric deformation of the force application aid 11 takes place. In that respect the base ring 15 serves in the regions without projection 16 substantially solely for peripheral connection of the projections 16 and thus for more easily fixing the position of the force application aid 11 to the pressure portion 1.

In the preferred embodiments illustrated of the pressure portion 1, the receiving surfaces 14 on which the rack Z bears are formed by individual sliding bodies 19 arranged replaceably on the receiving body 5 (see FIGS. 20-23). The two sliding bodies 19 are arranged in mutually opposite relationship in the second radial direction r2 on the receiving halves 6. They each have a sliding plate 20 with the receiving surface 14 and a plug projection 21 which extends in opposite relationship to the adjustment direction e and which for fixing to the receiving body 5 can be plugged into a plug receiver 22 on the receiving body 5.

Provided in the force flow region K between the receiver 2 and the adjuster 3 is an elastomeric spring arrangement 23 comprising a first elastomeric spring 24.1 and second elastomeric spring 24.2. The elastomeric springs 24.1, 24.2 are of a disk-like configuration with larger side surfaces 25 which in the installation position are arranged perpendicularly to the central longitudinal axis m. The elastomeric springs 24.1, 24.2 are arranged coaxially relative to the central longitudinal axis m, wherein the first elastomeric spring 24.1 is arranged radially inwardly and the second elastomeric spring 24.2 is arranged radially outwardly and directly adjoining the first elastomeric spring 24.1. To receive the elastomeric spring arrangement 23, there is provided a second receiving chamber 26 delimited by the receiver 2 and the adjuster 3. The receiver 2 and the adjuster 3 engage centrally into each other by way of a plug connection, with center centering thereof themselves and with center centering of the elastomeric spring arrangement 23. For that purpose, the receiver 2 has at the front in the adjustment direction e a pin-shaped extension 27 which axially displaceably engages into a central opening 28 in the adjuster 3 through a central through opening 28 in the first elastomeric spring 24.1. The elastomeric spring arrangement 23 radially directly adjoins the force application aid 11. In that way, axial force transmission between the receiver 2 and the adjuster 3 is effected solely by way of the elastomeric components, that is to say the elastomeric force application aid 11 and the elastomeric spring arrangement 23.

The first elastomeric 24.1 is elastically soft and the second elastomeric spring 24.2 is elastically hard. To guarantee deformation with constancy in respect of volume of the elastically hard second elastomeric spring 24.2 it has peripherally equally spaced, in this case eight, through openings 28 arranged on the periphery of a circle.

As can be seen in particular from FIG. 16, the slot 9 extends into the pin-shaped extension 27 so that the connecting limb 7 connecting the two receiving halves 6 is provided only at the end of the extension 27. In that way, a spreading movement of the two receiving halves 6 can be only very slightly impeded by the connection limb 7, if at all.

The adjustment device 3 shown in FIGS. 21-25 as individual views has an adjusting screw 30 which is at the front in the adjustment direction e and has a male thread 31 for thread engagement at the inside of the guide passage F. Providing adjoining it in the adjustment direction e is an annular projection 32 radially outwardly delimiting the second receiving chamber 26. The adjusting screw 30 can be actuated by way of a tool (not shown here), for the engagement of which there is here provided a tool opening 33 that is open in opposite relationship to the adjustment direction e. The annular projection 32 at the same time delimits at its end the first receiving chamber 12 and therefore radially outwardly has the above-described conical enlargement of the first receiving chamber 12 (see detail view C in FIG. 25).

Figure 32A:
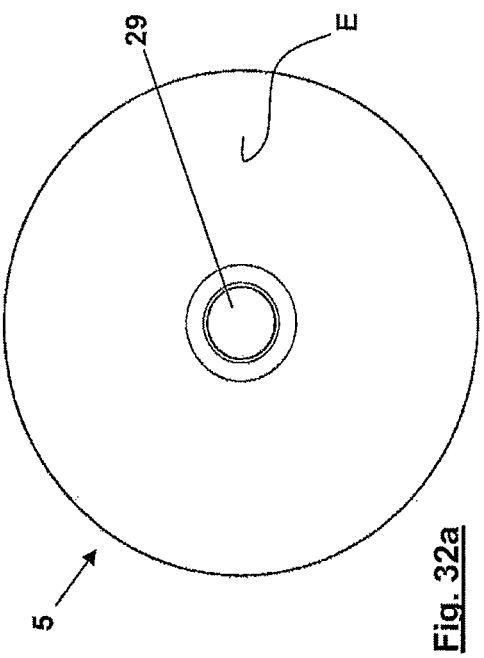

FIG. 31 shows a second preferred embodiment of pressure portion 1 with the additional distributor plate 4. The distributor plate 4 is shown in the preferred embodiment in each of FIGS. 32a and 32b. In that respect, the distributor plate 4 has at least one inclined plane E, at which axial forces are converted into radial forces, as a contact reaction. As shown in FIG. 32a, the inclined plane E extends at the end over the entire periphery of the circular configuration of the distributor plate 4. Accordingly, the distributor plate 4 has a conical basic shape. In the second preferred embodiment shown in FIG. 32b, the distributor plate 4 has two inclined planes E which come together in a ridge roof-like configuration to provide a central ridge line 34. In this case, the inclined planes E are curved and face with their normal to the plane with a directional component in the second radial direction r2, that is to say in the direction of the spreading movement of the receiving halves 6 under load. That further improves conversion of the axial forces in the second radial direction r2 with respect to the first embodiment of the distributor plate 4 shown in FIG. 32a. Further details in that respect are disclosed in DE 20 2010 011 990 U to which reference is directed here in this connection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pressure portion system (D) comprising:
a guide passage (F); and
a pressure portion (1) arranged in the guide passage (F), the pressure portion (1) comprising:
a receiver (2) for adjustable lateral support of a rack (Z) for a steering arrangement of vehicles; and
an elastomeric force application aid (11) positioned outside of the receiver (2) for transmission of forces from the pressure portion (1) to an inside wall (10) of the guide passage (F),
wherein the pressure portion (1) is arranged in a positionally variable relationship, guided linearly in the guide passage (F) for adjustment of the support of the rack (Z) in an adjustment direction (e), the pressure portion (1) having a loose position, wherein the pressure portion (1) is spaced from the inside wall (10) of the guide passage (F) for adjustment of the support for the rack (Z), and a load position, wherein the pressure portion (1) is enlarged or expanded with resect to a directional component (r2), which is radial relative to the adjustment direction (e), and radially braced under a pressure load against the inside wall (10) of the guide passage (F), such that the pressure portion (1) is in play-free contact with the inside wall (10) of the guide passage (F).

2. The pressure portion system (D) as set forth in claim 1, wherein the pressure portion (1) further comprises an adjuster (3) in front of the receiver (2) in the adjustment direction (e), wherein the force application aid (11) is arranged in a force flow region (K) between the receiver (2) and the adjuster (3).

3. The pressure portion system (D) as set forth in claim 2, wherein the force application aid (11) is supported axially in opposition to the adjustment direction (e) at the adjuster (3) and in the adjustment direction (e) and radially inwardly at the receiver (2).

4. The pressure portion system (D) as set forth in claim 1, wherein the pressure portion (1) has a round cross-section and the force application aid (11) is at least partially peripherally arranged.

5. The pressure portion system (D) as set forth in claim 1, wherein the force application aid (11) has a hollow cylindrical configuration with a constant radial wall thickness.

6. The pressure portion system (D) as set forth in claim 1, wherein the force application aid (11) has a one-piece configuration.

7. The pressure portion system (D) as set forth in claim 2, wherein the force application aid (11) is held axially non-displaceably in a radially outwardly opened first receiving chamber (12), and wherein the first receiving chamber (12) is delimited by the receiver (2) and the adjuster (3).

8. The pressure portion system (D) as set forth in claim 7, wherein the first receiving chamber (12) has at least a partially radially conically enlarged configuration for radial elastomeric deformation of the force application aid (11) under load.

9. The pressure portion system (D) as set forth in claim 7, wherein the first receiving chamber (12) is conically enlarged radially inwardly at a first angle (131), by way of a first radial portion (13.1) located at a front end thereof in the adjustment direction (e), and conically enlarged radially outwardly at a second angle (132), by way of a second radial portion (13.2) located at a rear end thereof in the adjustment direction (e).

10. The pressure portion system (D) as set forth in claim 1, wherein the receiver (2) delimits a receiving space (8) for the rack (Z), and wherein the receiving space (8) extends in a first radial direction (r1) perpendicularly to the adjustment direction (e) and the first receiving chamber (12) has a configuration opened in the adjustment direction (e) into two first partial peripheral regions disposed in a radially mutually opposite relationship in a first radial direction (r1).

11. The pressure portion system (D) as set forth in claim 10, wherein the first partial peripheral regions of the first receiving chamber (12) respectively extend over a first angular range of greater than or equal to 60° and smaller than or equal to 120°.

12. The pressure portion system (D) as set forth in claim 1, wherein in an installation position the force application aid (11) has a full-peripheral base ring (15) of a first axial extent (a1), at a front end thereof in the adjustment direction (e), which has a configuration that is continuous in a peripheral direction from the first radial direction (r1) to the second radial direction (r2) or has an enlarging configuration by way of at least one step (17) in the adjustment direction (e) axially to a second axial extent (a2).

13. The pressure portion system (D) as set forth in claim 2, further comprising an elastomeric spring arrangement (23) provided in the force flow region (K) between the receiver (2) and the adjuster (3), the elastomeric spring arrangement (23) being positioned radially inwardly in relation to and in the adjustment direction (e) in front of the force application aid (11), wherein the force application aid (11) radially outwardly directly adjoins the elastomeric spring arrangement (23).

14. The pressure portion system (D) as set forth in claim 13, wherein the elastomeric spring arrangement (23) has at least a first elastomeric spring (24.1) and a second elastomeric spring (24.2), arranged coaxially relative to a longitudinal central axis (m) and in a radially mutually adjoining relationship, and wherein the first elastomeric spring (24.1) is arranged radially inwardly and the second elastomeric spring (24.2) is arranged radially outwardly.

15. The pressure portion system (D) as set forth in claim 14, wherein the elastomeric springs (24.1), (24.2) have larger side surfaces (25) which in an installation position are arranged perpendicularly to the longitudinal central axis (m), and wherein an axial thickness (d) of each of the elastomeric springs (24.1), (24.2) is equal.

16. The pressure portion system (D) as set forth in claim 14, wherein the first elastomeric spring (24.1) is elastically softer than the second elastomeric spring (24.2).

17. The pressure portion system (D) as set forth in claim 14, wherein at least the second elastomeric spring (24.2) has a plurality of through openings (28) arranged in a ring to compensate for a flow in respect to volume upon loading of the elastomeric springs (24.1), (24.2) with constancy in respect to volume thereof.

18. The pressure portion system (D) as set forth in claim 13, wherein the elastomeric spring arrangement (23) is arranged in a second receiving chamber (26) delimited by the receiver (2) and the adjuster (3), and wherein the receiver (2) and the adjuster (3) are supported at the elastomeric spring arrangement (23).

19. The pressure portion system (D) as set forth in claim 13, wherein the receiver (2) and the adjuster (3) preferably engage centrally into each other by a plug-in connection with center centering of them themselves or with center centering of the elastomeric spring arrangement (23).

20. The pressure portion system (D) as set forth claim 1, wherein at least in regions in lateral contact against the rack (Z), the receiver (2) has a coating with a wear-resistant plastic material with modified sliding properties or at least one sliding body (19) fixed to the receiver (2) and comprising a wear-resistant plastic with modified sliding properties.

21. The pressure portion system (D) as set forth in claim 20, wherein the sliding body (19) is arranged by means of a plug connection on the receiver (2).

22. The pressure portion system (D) of claim 1, further comprising:
the rack (Z) for a steering arrangement of vehicles; and
an adjuster (3) arranged in front of the receiver (2) in the adjustment direction (e);
wherein the force application aid (11) is positioned in a force flow region (K) between the receiver (2) and the adjuster (3).

23. A pressure portion (1) comprising:
a receiver (2) for adjustable lateral support of a rack (Z) for a steering arrangement of vehicles;
an adjuster (3) in front of the receiver (2) in an adjustment direction (e);
an elastomeric force application aid (11) arranged in a force flow region (K) between the receiver (2) and the adjuster (3) and positioned outside of the receiver (2) for transmission of forces from the pressure portion (1) to an inside wall (10) of a guide passage (F); and
an elastomeric spring arrangement (23) provided in the force flow region (K), positioned radially inwardly relative to the force application aid (11) and positioned in front of the force application aid (11) in the adjustment direction (e), the force application aid (11) radially outwardly directly adjoining the elastomeric spring arrangement (23);

wherein the pressure portion (1) is arranged in a positionally variable relationship guided linearly in the guide passage (F) for adjustment of the support of the rack (Z) in the adjustment direction (e) and is enlarged or expanded for at least partial contact with an inside wall of the guide passage (F) with respect to a directional component (r2) which is radial relative to the adjustment direction (e).

24. The pressure portion (1) as set forth in claim 23, wherein the elastomeric spring arrangement (23) has at least a first elastomeric spring (24.1) and a second elastomeric spring (24.2), arranged coaxially relative to a longitudinal central axis (m) and in a radially mutually adjoining relationship, and wherein the first elastomeric spring (24.1) is arranged radially inwardly and the second elastomeric spring (24.2) is arranged radially outwardly.

25. The pressure portion (1) as set forth in claim 24, wherein the elastomeric springs (24.1), (24.2) have larger side surfaces (25) which in an installation position are arranged perpendicularly to the longitudinal central axis (m), and wherein an axial thickness (d) of each of the elastomeric springs (24.1), (24.2) is equal.

26. The pressure portion (1) as set forth in claim 24, wherein the first elastomeric spring (24.1) is elastically softer than the second elastomeric spring (24.2).

27. The pressure portion (1) as set forth in claim 24, wherein at least the second elastomeric spring (24.2) has a plurality of through openings (28) arranged in a ring to compensate for a flow in respect to volume upon loading of the elastomeric springs (24.1), (24.2) with constancy in respect to volume thereof.

28. The pressure portion (1) as set forth in claim 23, wherein the elastomeric spring arrangement (23) is arranged in a second receiving chamber (26) delimited by the receiver (2) and the adjuster (3), and wherein the receiver (2) and the adjuster (3) are supported at the elastomeric spring arrangement (23).

29. The pressure portion (1) as set forth in claim 23, wherein the receiver (2) and the adjuster (3) engage centrally into each other by a plug-in connection with center centering of them themselves or with center centering of the elastomeric spring arrangement (23).

* * * * *